US005862550A

United States Patent [19]

Cosani

[11] Patent Number: 5,862,550

[45] Date of Patent: Jan. 26, 1999

[54] APPARATUS FOR USE IN PREVENTING DECUBITIS ULCERS AND IN RELAXATION THERAPY

[76] Inventor: Adolfo Cosani, 37 Bird Rd., Lilianton, Boksburg Gautons, South Africa

[21] Appl. No.: 796,549

[22] Filed: Feb. 6, 1997

[30] Foreign Application Priority Data

Feb. 8, 1996 [ZA] South Africa .......................... 96/0993

[51] Int. Cl.[6] .......................... A61H 1/00; A61C 7/057

[52] U.S. Cl. .......................... 5/612; 5/613; 5/238; 5/241; 5/934

[58] Field of Search .......................... 5/612, 613, 238, 5/241, 900.5, 933, 934, 935, 937

[56] References Cited

U.S. PATENT DOCUMENTS

| | | | |
|---|---|---|---|
| 2,445,158 | 7/1948 | Sparhawk | 5/933 X |
| 2,773,498 | 12/1956 | Himmelman | 5/934 X |
| 3,298,363 | 1/1967 | Perkin | 5/834 X |
| 4,947,832 | 8/1990 | Blitzer | 128/33 |
| 4,999,861 | 3/1991 | Huang | 5/60 |
| 5,109,558 | 5/1992 | Di Blasi | 5/611 |
| 5,233,712 | 8/1993 | Jurus et al. | 5/613 |
| 5,443,439 | 8/1995 | Uhshita | 5/613 X |
| 5,626,555 | 5/1997 | Di Blasi et al. | 5/612 X |

FOREIGN PATENT DOCUMENTS

| | | | |
|---|---|---|---|
| 2 544 609 | 10/1984 | France . | |
| 2 615 378 | 11/1988 | France . | |
| 903813 | 10/1995 | France | 5/238 |
| 2 509 827 | 6/1988 | Germany . | |
| 1 220 502 | 2/1988 | Italy . | |
| 2 015 872 | 9/1979 | United Kingdom . | |
| PCT/ESP94/ 00054 | 12/1994 | WIPO . | |

*Primary Examiner*—Michael F. Trettel
*Attorney, Agent, or Firm*—Foley & Lardner

[57] ABSTRACT

An apparatus in the form of a bed or chair for providing relaxation therapy and prevention of decubitis sores is distinguished by the use of flexible beams of the nature of leaf springs. Instead of being lifted up and down by rather complex apparatus only a single shaft carrying cams is provided which acts on the leaf spring-like beams to flex them upwardly and/downwardly to provide the required action. Preferred cams provide no lifting action but only intermitted depressing action of these beams which reduces vertigo and nausea effects and can be slid onto a cam shaft in any one of a multiple alternative angular positions. This enables selection of the travelling wave action for relaxation therapy and of the decubitis preventing action.

16 Claims, 10 Drawing Sheets

FIG. 25
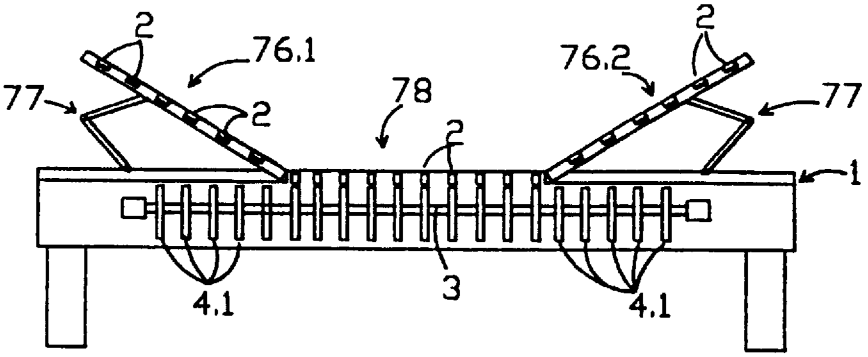
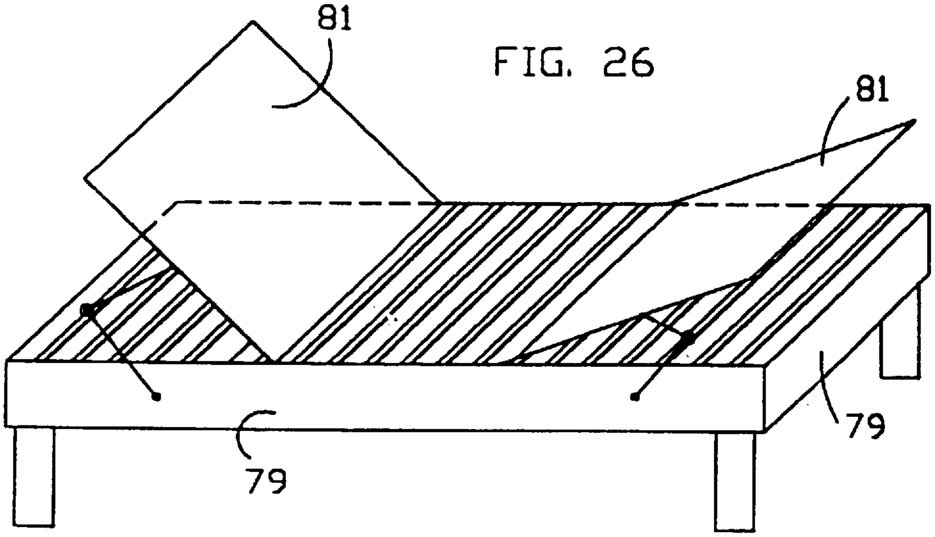
FIG. 26
FIG. 27
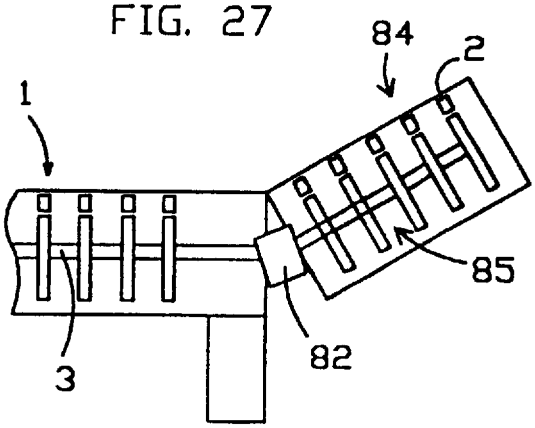

APPARATUS FOR USE IN PREVENTING DECUBITIS ULCERS AND IN RELAXATION THERAPY

BACKGROUND OF THE INVENTION

1. Field of the Invention

Bed sores, also called decubitis ulcers or pressure sores are an area of disintegrating skin and underlying tissue or ulcer resulting from decreased blood supply to that area and affecting persons who have been bedridden for a long period of time.

2. Description of the Prior Art

Specially designed beds are intended to mitigate this problem. U.S. Pat. No. 4,999,861 and Italian patent 122 0502 are examples of the art in this field. The present invention may also be applied to chairs, e.g. wheelchairs for paraplegics, and divans.

Apparatuses of this kind have suffered from undue complexity in mechanical construction and arrangements. This disadvantage leads in general to a high cost for the apparatus thus imposing a severe limitation on the generality of its potential application.

The art also has reported adverse effects from the application of treatment using these kinds of apparatus. These effects have been reported as a fatigue, vertigo and even nausea resulting from long periods of treatment with the apparatus. These adverse side effects naturally discourage use of the apparatus in the treatment of decubitis ulcers or the reduction of their incidence.

SUMMARY OF THE INVENTION

A main feature of the present invention has thus been directed to the provision of an apparatus which allows the main effects to be achieved with a manufacture and construction which can be inexpensive, light and uncomplicated.

Thus, in accordance with the invention there is provided an apparatus of this kind for support of a body which comprises a plurality of flexible beams which extend transversely and parallel to each other and adjacent to one another, supported at their ends and having a shaft running longitudinally and orthogonally to the beams and underneath the beams, the shaft having a plurality of cams mounted on it, the cams engaging at least some of the beams and adapted so that upon rotation of the cams the beams are flexed by the cams to be alternatingly raised or alternatingly lowered, or alternatingly raised and lowered.

Thus, for example, in an apparatus which provides support in a manner analogous to a bed, whether entirely in a prone position or in a partly reclining position, the beams extend transversely from one side of the apparatus to the other side of the aparatus. The single shaft is preferably located generally centrally, and running longitudinally. The shaft may be adapted to be rotated from time to time manually so as to bring one set of beams into a supporting position and to lower another set the beams to provide for the restoration of circulation in the body surfaces opposite that set of beams. Alternatively, the shaft may be adapted to be rotated by an electric or other motor with a suitable gearing. The rotation in accordance with the invention may be selected either to be continuous at a fairly slow rate or intermittent. Where intermittent motion is required this can be provided by a suitable controller and stepping motor.

In accordance with the invention the flexible beams are leaf springs, one end being secured to a frame of the apparatus and the other end being enclosed but free to move longitudinally to a limited extent as the leaf-spring-like beam flexes under action of the cam acting on it.

As an alternative structure to the use of flexible beams which are in the nature of leaf springs, each beam may be articulated near its mid length, one or both ends then being enclosed but free to move longitudinally to a limited extent when the beam articulates under action of the cam.

Preferably in either event the beams are provided with cam following surfaces so that the cams may have sliding contact with the surfaces of the beam, these surfaces being of low friction co-efficient material. Preferably the cam following surfaces are in the form of a replaceable wear pad.

As an alternative the cams can be provided to act on roller type followers which are provided on the beam.

The levels of the beams may vary in accordance with a profile in the longitudinal direction, as is desired for support of the prone body.

In order to achieve this the effective depth of the cam followers on successive beams may be selected to vary according to a desired longitudinal profile of the dorsal part of the human body. In this way the development of above average pressure on prominences of the dorsal profile of the body may be avoided.

It is another important feature of the invention that the cams will be selected so that the alternating movement of the beams does not result in the body being raised and lowered alternatingly. Instead the cams will be selected so that the beams provide for a support of the body at a constant level with alternating sets of the beams lowering to a position in which they remove pressure from the body tissues in the areas opposite that set of beams. In this way by avoiding cams which generate alternating upwards and downwards movement of the body it is possible to avoid the deleterious effects which have been reported in the art.

The potential for the apparatus to adapt to the longitudinal dorsal profile of the prone human body or the other profiles of the body, for example, the sides and if required the ventral profile can be provided by a special optional feature of the invention. This is the provision of the cam carrying longitudinal shaft in the form of a flexible cable able to flex while rotating. The cable is mounted rotatively in journals which are sprung mounted on a base or frame of the apparatus. The journals thus may yield differently to different loads along the length of the apparatus and therefore accommodate the profile of the body by virtue of the flexibility of the shaft.

The sprung mounting of the journals which carry the flexible shaft may be achieved, for example, by means of a coil spring under each journal, with suitable locating mechanisms provided. As an alternative to a coil spring a transverse leaf spring will have the advantage of providing both the flexibility of support of the journals for the flexible shaft and also will tend to the locate them sufficiently.

Preferably the shaft has a non circular cross sectional shape extending uniformally in the length of the shaft so that the cams can be slid along the length of the shaft to required positions but are not free to rotate about the shaft.

Where the cross sectional shape has a polygonal symmetry this allows the cams which have a hole fitting that cross sectional shape of the shaft to be fitted on to the shaft in any one of the plurality of a angularly separated positions. This allows for the adaptation of the apparatus in a number of alternative ways in accordance with this invention. In particular, for example, for the purpose of treatment to reduce the tendency for development of decubitis ulcers the cams will be provided, for example, alternatingly fitted on to the shaft at 180° rotation relative to each successive cam.

A final, and important feature of the invention rests on a discovery that the apparatus, although it could be regarded as one having the purpose of preventing decubitis ulcers can, with careful adaptation, be suitable for the application of relaxing massage. With this invention the massaging can avoid the problems of the prior art devices of recorded experiences of adverse physiological and psychosomatic effects such as fatigue, vertigo and nausea. It has furthermore been established that the massaging action, as will be described below, can have a simultaneous decubitus prevention effect in suitable cases.

Thus in accordance with this preferred embodiment of the invention the cams on the shaft are angularly oriented in successive positions along the length of the shaft so as to induce in the surface presented by the beams the effect of a travelling wave when the shaft rotates, the wave travelling longitudinally along the length of the apparatus and having a flat top to the wave form. The wave will preferably travel from the foot to the head of the bed to enhance venous blood circulation in a person lying on the bed.

In order to understand conceptually how this can be achieved by a suitable orientation of the cams the example can be considered where each successive cam of the kind shown in FIGS. 6 to 8 is angularly oriented clockwise with respect to the preceding cam, as one proceeds along the length of shaft, by a constant specified angle such, for example, as 45°. With this arrangement every 8th cam will then be oriented angularly the same as the first cam and the beams in between will be raised by the cams to follow a flat top sinusoidal wave form proceeding longitudinally along the apparatus. It may be desirable for this form to be attained by a larger number of cams or over a longer distance, in which case the successive orientation would be smaller between successive cams than 45°, e.g. 30°. Alternatively, the successive orientations may be by a larger angular difference. When the shaft is rotated with the cams oriented in this way the sinusoidal wave form presented longitudinally along the apparatus by the successive beams appears to travel along the length of the apparatus. This has been found to have a calming effect on a person resting on the apparatus, thereby relaxing the patient. The length of time which this must be carried out is limited and may vary, for example, between 5 minutes and 30 minutes, preferably being between 10 mins and 20 mins. A timer is preferably provided on the apparatus to allow setting the time of operation. Because of the undulating travelling wave effect a soothing impression is created on the body rather than an impression which in time becomes adverse. The invention includes an apparatus in which these arrangements have been provided for. The wave may travel at 2.4 meters per minute with the shaft rotating at 4 r.p.m.

The effects described above have been observed in tests in a hospital in Udine, Italy. Apart from a sinusoidal wave form any other wave form in principle can be provided for and certain wave forms can be designed to have a therapeutic effect. For example a wave form which comprises an asperity at the peak of the form can be adopted to provide a more acute massage or a wave form having a steeper rising part than its lowering part, for example.

The tests which have been performed with prototypes of the apparatus in accordance with this invention in the massaging application, that is for purposes of relaxation and improvements to the blood and lymphatic circulation, have revealed an important new result. In accordance with this aspect of the invention the preferred wave form which is produced by the cams selected for the shaft and their relative angular orientation with respect to each other is a wave form which may be described as a flat topped wave form. This wave form is a further novel feature in the art and it has the advantage that instead of a wave form advancing along the length of the bed which has a peak or moderate asperity, in accordance with this invention the top of the wave form is a flat plateau whereas the bottom part of the wave form may follow, for example, a sinusoidal shape. The portion of the wave which takes the main support of the body and thus produces the main pressure on the body is a shape which provides a distributed pressure over the body not provided by a peak. The result is a lower distributed pressure on the body and it is believed that this has a more favourable effect in improving circulation. Because there is less localised pressure, the massage is more relaxing.

The mechanical arrangement in which this type of wave form is produced is achieved in accordance with the invention by the use of cams which have a sector of the cam profile which may vary between, for example, 90° and 180° of constant radius measured from the axis of rotation of the cam, the remaining sector being of a reduced radius to provide the low part of the wave form on the bed. Further in accordance with this aspect of the invention the relative angular advance from one cam to the next cam along the length of the cam shaft and thus also along the length of the bed is selected with due consideration of the angle of constant radius of the cam profile. Thus, for example, if the cam profile has a portion of constant radius of 120° then the angle of advance of each cam to the next successive adjacent cam may be selected at 30°. This means that a plateau is created which is flat over the length of four cams along the length of the shaft because all of these will still be presenting the sector of constant radius. Beyond these four cams, if the angular advance of 30° is maintained there will be eight cams which provide the wave form moving from the plateau downwards in an approximation at least of a sinusoidal wave shape. Of course, the angular advance from one successive cam to the next need not necessarily be maintained at 30° along the full length of the wave form, as an alternative in accordance with the invention. Also naturally any other angle of advance than 30° may be selected, this being merely a convenient example. Thus in this way the proportion of the total wave length which has the flat plateau can be selected in accordance with the invention.

In accordance with the invention the shaft has a non-circular cross-section or, for example, a polygonal cross-section (simple and convenient is a square cross section, which can be provided inexpensively in a hollow square section tube). The bore of each of the cams which fits on that shaft may in fact be a serrated or toothed shape having 12 indentations so that the cam can be fitted onto the shaft in any one of 12 different orientations. This means that using a constant cam profile, each successive cam can easily be mounted on such a shaft with a 30° advance relative to the preceding adjacent cam. Thus, in a convenient and inexpensive way, a flat top or plateau type of wave profile along the length of the bed can be achieved.

The cams can easily be slid off the shaft and reoriented so that each cam is 180° advanced with respect to the preceding cam and this can provide, with cams where the portion of constant radius is 180°, decubitis relief. In this action, alternate beams actuated by the cams will lower so as to provide a relief of the support and pressure on the body in the classical decubitis action, but without raising and lowering the body. Hence the same apparatus can be adapted for decubitis relief and massage.

This wave type of massage can be implemented using a rigid shaft running longitudinally or a flexible cable type shaft running longitudinally.

BRIEF DESCRIPTION OF THE DRAWINGS

The invention will be more fully described by way of examples with reference to the accompanying drawings, in which:

FIGS. 25 to 27 show sectional side views of three preferred apparatuses;

DETAILED DESCRIPTION OF THE PREFERRED EMBODIMENTS

Figure 1:
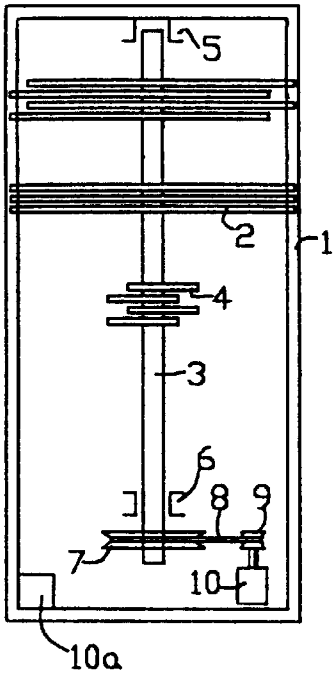
FIG. 1 is a plan view of the apparatus in accordance with a preferred embodiment of the invention, shown schematically.
Figure 2:
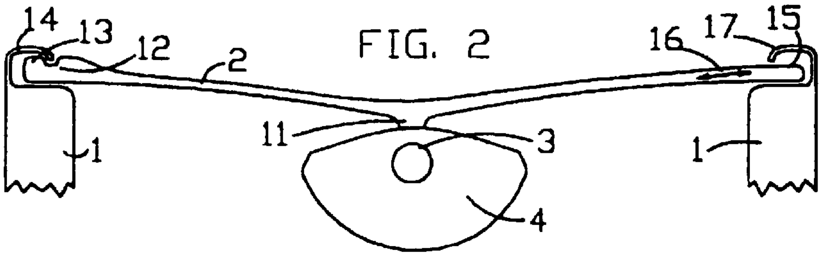
FIG. 2 is an enlarged transverse sectional elevation of the apparatus shown in FIG. 1.

As shown in FIGS. 1 and 2 the apparatus comprises a rigid rectangular frame 1 in which the operating parts are mounted. A plurality of flexible beams 2 which span the transverse dimension of the frame 1 extend transversely and parallel to each other and adjacent one another. They are supported at their ends by the frame. The shaft 3 runs longitudinally in the frame 1 and thus orthogonally to the beams and is located underneath them. In the view of FIG. 1 only a small number of beams is shown so as to be able to illustrate the shaft and sufficient beams will be provided to cover the entire upper surface enclosed within the frame 1. The shaft 3 has a plurality of cams 4 on it and again only a few cams are shown by way of illustration, one cam in fact being provided for every beam and thus extending along the full length of the shaft. The shaft is journaled at 5 and 6 and a pulley 7 allows for a connection by means in this example of a V-belt 8 to a pulley 9 of an electric motor 10 with gearbox which rotates either at an appropriate continuous feed or intermittently. The motor could alternatively be direct coupled through a suitable gearbox. A timer **10*a*** controls the motor to a preset duration or even for a programmed sequence of operations over 24 hours, e.g. per a doctor's prescription.

As shown in more detail in the view of FIG. 2 the beam 2 has a cam following surface 11. This can have replaceable wear pads of polytetrafluoro ethylene (PTFE). One end of each beam has a notch 12 which fits into a down turned web 13 of an inverted channel formation 14 of the frame 1 while the other end 1 5 of the beam 2 is free to move longitudinally as indicated by the arrows 16 to a limited extent being retained at its end by means again of the inverted channel 17 of the frame. This allows the same type of frame members to be used all around the frame. The beam 2 is made of a flexible material and so functions somewhat like a leaf spring. The beam may be a steel leaf surrounded by a suitable plastic coating to make it more appropriate as a support for a thin mattress of a bed which this example provides. The beam may be made of plastic material, e.g. injection molded. The anchored ends of the beam alternate on left and right longitudinal sides of the frame. The beam presents a slightly concave upper surface, but could alternatively be flat.

Figure 3:
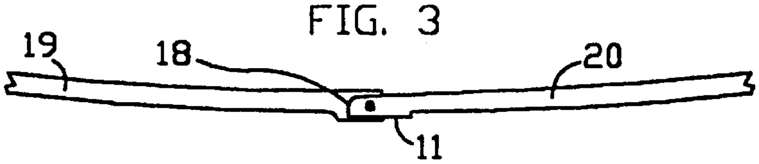
FIG. 3 is a partial view of an alternative transverse beam.

FIG. 3 shows that the beam 2 could alternatively be articulated at its centre position 18, each half 19 and 20 of the beam therefore being relatively rigid and the articulated joint allowing for upwards and/or downwards movements under action of the cam.

Figure 4:
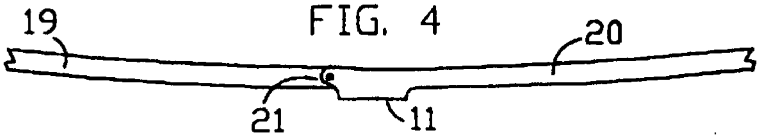
FIG. 4 is a partial elevation of a further alternative transverse beam.

FIG. 4 shows one slightly different arrangement where the articulation point 21 is not in the centre of the beam but somewhat to one side.

Figure 5:
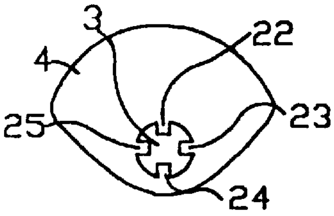
FIG. 5 is a transverse sectional elevation of a shaft and cam.

FIG. 5 shows one preferred arrangement of the shaft 3, this having four longitudinally running grooves 22, 23, 24 and 25, with the cam 4 having a hole which has projections in the hole which match these grooves. This allows the cam to be slid on to the shaft to any longitudinal position along the length of the shaft but to be irrotationally held. It also allows the cam to be slid on to the shaft in any one of four angularly differentiated orientations as will be necessary in order to perform the various functions of which the apparatus is capable as has been described heretofore. As an alternative the shaft could be of square section, either hollow or solid, or it could have a larger number of grooves.

Figure 6:
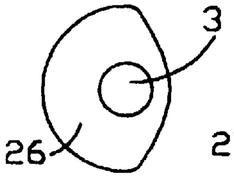
FIG. 6 is a further elevation of a cam.
Figure 7:
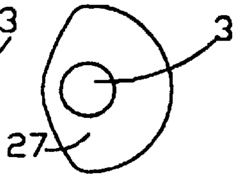
FIG. 7 is a further elevation of an adjacent cam.
Figure 8:
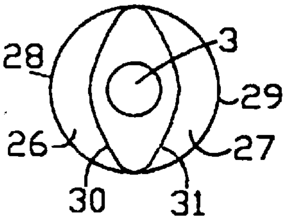
FIG. 8 is an elevation of the two cams as they are mounted on the shaft, for decubitus.

Thus for the use of the apparatus to avoid decubitis ulcers and wave therapy cam arrangements are shown in FIGS. 6 to 8.

FIGS. 6 and 7 show a first cam 26 an the next following cam 27 on the shaft 3, the cam after the cam 27 being arranged as the cam 26, and so on alternatingly.

FIG. 8 thus shows the cams 26 and 27 (all the other cams alternating in a similar relationship) on the shaft 3. It will be seen that the surfaces 28 and 29 of the two cams 26 and 27 respectively together combine to form a circle that is of constant radius. The other two surfaces 30 and 31, however, are of reduced radius. The effect of this is that the beams do not oscillate upwards and downwards in a manner which would cause the body of the patients to be lifted up and down in a cyclical way but instead the body of the patient always remains at a level as determined by the radius of the portions 28 and 29 of the cams and the thickness of the beams above that. Alternate beams, however, drop below the level of that surface when the surfaces 30 and 31 respectively of the cams come into operation. The result of this is that the body is kept at a constant height on the apparatus but the supporting beams alternately drop to a lower position so that the supporting pressure on the body is taken by the beams in between. After a period the beams which had dropped down raise up to this same level and then the alternative beams drop down so as to remove the pressure on the body parts in those areas.

In this way movement which would cause the body to oscillate upwards and downwards is avoided and this is found to be important to avoid any feeling of nausea, vertigo or fatigue or at least to reduce the tendency of those feelings developing to a large extent, if not to entirely eliminate them. At the same time the alternating locations on the body have pressure removed from them so as to restore circulation. For this reason the timing of the movements would be appropriate as is recorded to physiological needs of the body for the restoration of circulation in the alternating position. Thus an electric motor driving the shaft could in fact be a stepping motor controlled by a suitable controller so that the shaft rotates through 180° then stops for a period sufficient for recovery of circulation, then rotates a further 180° and so on. These time periods may be in the region of 8 to 30 minutes, for example.

Figure 9:
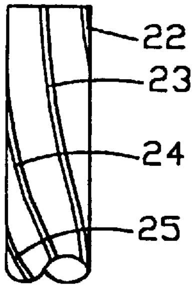
FIG. 9 is a plan view on an alternative shaft.

FIG. 9 shows the shaft in the case where the grooves 22 to 25 follow a spiral form rather than being straight. This shaft can be used particularly, for example, to obtain the effects which will be described with reference to FIG. 18.

Figure 10:
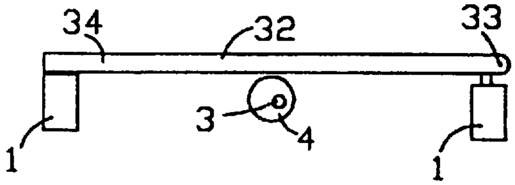
FIG. 10 is a transverse sectional elevation on an alternative beam.

FIG. 10 shows a transverse cross sectional elevation showing upper parts of the frame 1 and a flexible supporting beam 32 which is articulated only at one end 33 at the frame 1, the other end 34 being free. The result is that the cam 4 rotating on the shaft 3 again periodically lowers the beam 32 for the effects described.

Figure 11:
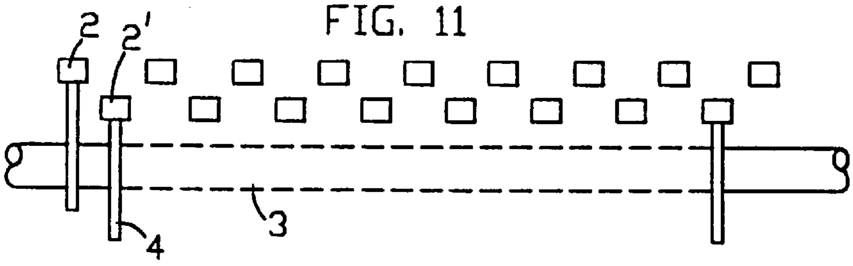
FIG. 11 is a side view schematically of a shaft, cams and beams.

FIG. 11 is a side schematic elevation of the apparatus in which the plurality of beams 2 can be seen with the cams 4 on the shaft 3. For ease of illustration, only a few cams are shown but one cam would be provided for every beam. This shows the alternating arrangement in which evenly numbered beams, numbering from one end, are at a level which is the consistent level of support of the body while odd numbered beams, e.g. 2', have dropped down to a lower level so as to remove pressure from the body tissues at each of these beams 2'. Thus half the beams are at the level of support and the other half have moved downwards to remove pressure on the tissues. As the shaft 3 continues to rotate, the odd numbered beams 2 are lowered and the evenly numbered beams 2' rise to the level of the body. This alternates, as has been described, the pressure on the body tissues. This is designed to avoid of decubitis ulcers.

Figure 12:
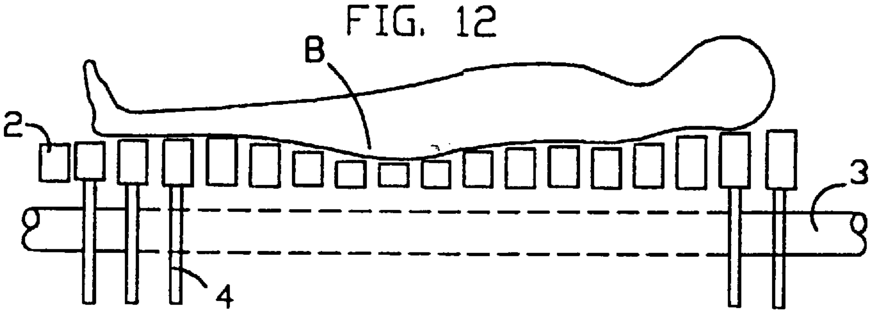
FIG. 12 is a similar view on a shaft and cams with alternative beams having differing thickness cam followers.

FIG. 12 shows another embodiment of the invention in which the shaft 3 and cams 4 are as previously described, but each of the beams 2 has a beam follower of a selected thickness as is indicated. The selection of the thickness is adapted to provide for an accommodation of the contours of the human body as is shown by the line B. This can provide a greater comfort of support for the individual, and reduced pressure on prominences.

Figure 13:
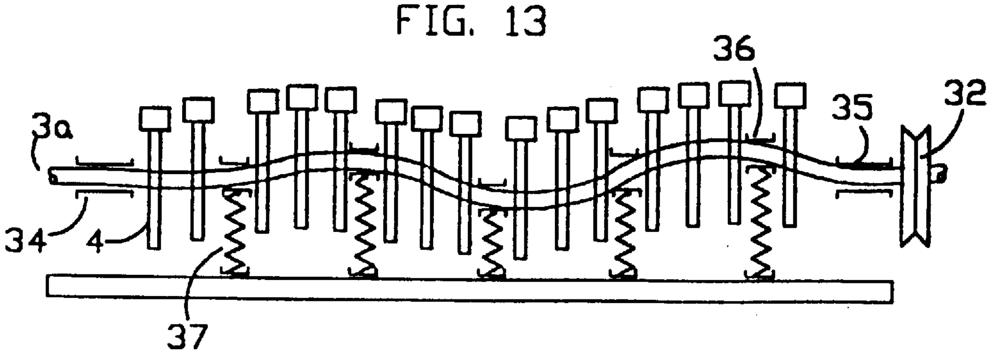
FIG. 13 is again a similar side elevation of a shaft, cams and beams where the shaft is a flexible kind.
Figure 14:
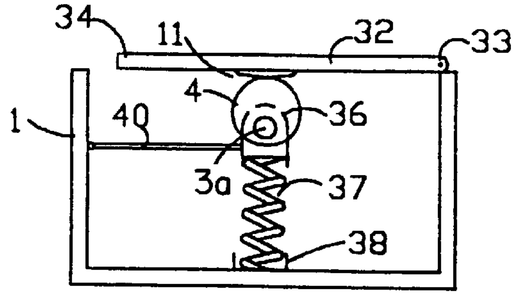
FIG. 14 is a transverse sectional elevation on a flexible shaft, cams and beams.

FIG. 13 shows an extension of this idea of adapting to the dorsal profile of the prone human body in an entirely flexible way which will react to the profile of each different individual. Here the shaft 3*a* is in fact a flexible cable. It is journaled at its ends 34 and 35 in the apparatus and has a pulley 32 by way of example to rotatively drive the flexible shaft. At the position of mounting of the pulley the shaft can be made rigid. The shaft again carries a plurality of cams 4 which may be of the kind which has been described heretofore. Along the length of the shaft 3*a* a plurality of journals 36, which may be ball races in suitable housings, are supported by springs 37. Thus an elastic support for the flexible shaft 3*a* is provided and accordingly it is able to yield to the pressure provided by prominences in the dorsal profile of the prone human body. This thus is analogous to a sprung support for the human body and it allows a more comfortable posture to be arrived at. At the same time, once the shaft rotates the alternating support between even and odd numbered transverse beams avoids decubitis ulcer development. This arrangement is also shown in FIG. 14 in which it can be seen in the frame 1 with the beams 32 articulated at 33 with ends 34 by way of example (the other beams as shown, for example, in FIGS. 2 to 4 could alternatively be used). On the flexible shaft 3*a* is one of the cams 4 working on the cam follower 11. Around the shaft 3*a* is the journal 36 (which could also be a lubricated bush and journal arrangement) the journal 36 has a foot piece or base onto which the coil spring 37 presses, the coil spring being located by structure 38 on the base 39 of the frame 1. Transverse location of the journal 36 could be provided by an articulated arm 40 fixed to one side of the frame 1 and fixed to the journal 36.

Figure 15:
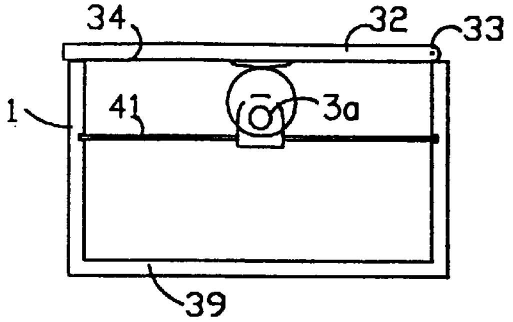
FIG. 15 is a similar transverse sectional elevation of a flexible shaft in an alternative arrangement.

FIG. 15 shows an alternative arrangement in which the parts are similar except that instead of the coil spring 37 there is provided a leaf spring 41 which extends between the sides of the frame 1. The journal 36 is fixed on to the leaf spring 41 and again it may be fixed at one end to the frame 1 while the other end is contained in a slot but slidably to allow limited transverse movement of that end of the leaf spring as it flexes.

Figure 16:
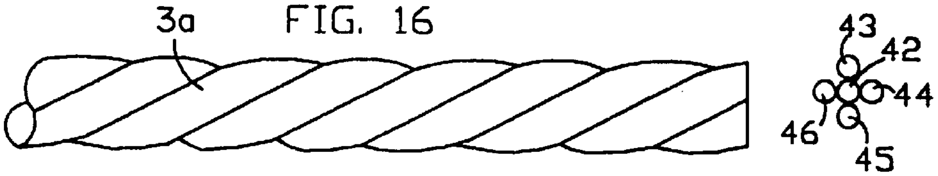
FIG. 16 is a side view and end view of a flexible shaft.

FIG. 16 is a side elevation and end view of a flexible shaft 3*a*. This is a cable with a core 42 and four strands 43 to 46 laid around the core 42 equally spaced from each other. This provides a cross-sectional shape for the shaft analogous to the rigid shaft described with reference to previous figures; the cams can be slid along the length of the shaft. Because of the helical nature of the lay this flexible shaft will inherently have the helical aspect which was described as an option with respect to the rigid shaft of FIG. 9. Even with this helical aspect the shaft can be rotated intermittently by a suitably timed stepping motor in order to achieve the avoidance of decubitis ulcers.

When such a shaft is rotated continuously, however, the effect on the transverse beams is of a travelling wave.

Figure 17:
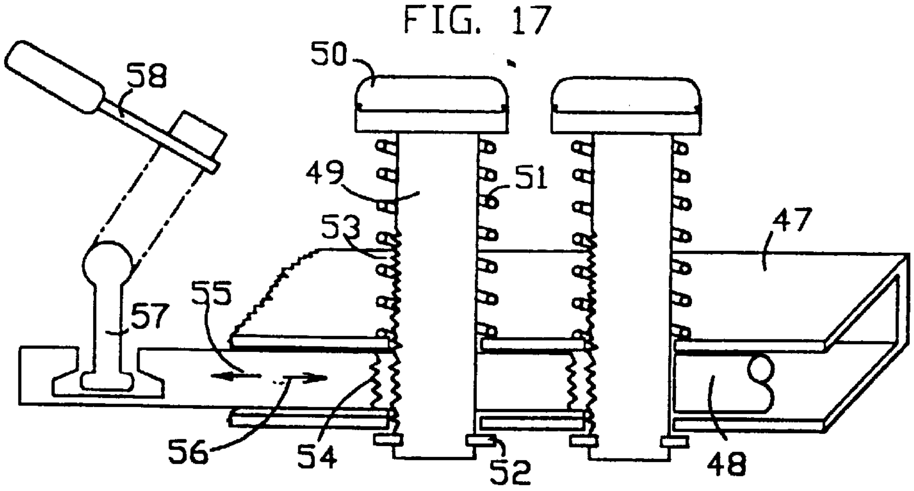
FIG. 17 is a side elevation of an alternative form responsive arrangement of beams.

FIG. 17 shows a structure in which inherent potential for adjustment to the profile of a prone body on the apparatus is provided. Each of the transverse beams 47 is of tubular form and contains within it a sliding rod 48. Each beam carries a plurality of upright posts 49, each of which presents a supporting pad 50 for the human body. Coil springs 51 tend to keep these posts 49 in the upright position at an upper position established by the ring clips 52. On one side of the posts 49 there is provided a toothed rack 53. The sliding rod 48 has a number of holes through which the upright posts 49 pass and these are slotted holes with one side of the holes having a toothed formation 54 which is complimentary to the teeth 53. When the shaft 48 is moved to the left as indicated by the arrow 55 in all of the transverse beams 47 the person is placed or gets on to the apparatus lying in a prone position, for example, dorsal side down. Against a bias of the springs 51, each of the supports 50 is pressed downwards to a degree dependent on the dorsal profile of the person and the distribution of weight in the body. Once the person is settled in a comfortable position the shaft 48 is moved to the right as indicated by the arrow 56 and the teeth 54 then lock into the teeth 53 locking the apparatus in this position. The movement of the shaft 48 is provided by a lever 57 which is connected in a suitable way (not shown) to a handle 58.

Figure 18:
FIG. 18 is a side elevation showing a wave form that can be generated for relaxation therapy, (and can have a decubitus effect)

FIG. 18 indicates with the line 60 a typical wave motion which will be adopted by the beams when the shaft is of the helical kind so that each cam is angularly rotated relative to the previous through a suitable angle. This means that the level of the beams follows the line 60 and once the shaft is rotated the wave form 60 then appears to travel in a longitudinal direction either to the right or the left. The preferred wave form is approximately sinusoidal with a flattened wave top 60*a;* this wave form is provided by the cams of the shape shown in, and described with reference to FIGS. 6 to 8. This travelling wave has been found to provide a valuable relaxation therapy which does not tend to the provision of effects such as fatigue, vertigo or nausea as has been reported in the prior art. Nevertheless, the operation of the apparatus to provide a relaxation therapy is preferably selected at the time of between 1 and 30 minutes or preferably between 5 and 20 minutes. The rate of movement of the travelling wave may, for example, be between 25 and 100 mm per second, more preferably between 40 and 60 mm per second, i.e. 2.4 m per minute. These aspects can be adjusted in the discretion of the physician according to the individual.

Figure 19:
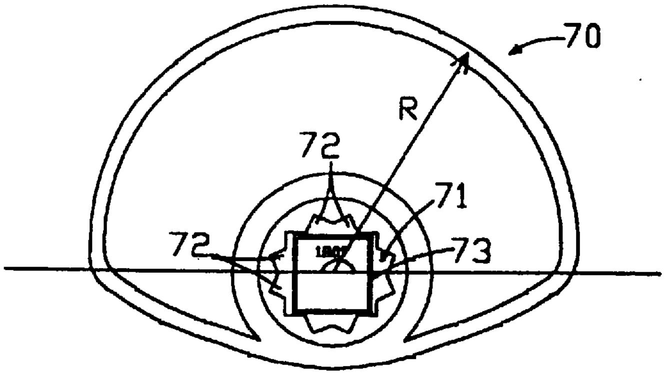
FIGS. 19 to 21 show elevations of three preferred cams as they are mounted on a shaft.

FIG. 19 shows a cam 70 having a profile similar to that of cam 26 shown in FIG. 5 for inducing a decubitis action. In this particular embodiment a bore 71 having twelve serrated indentations 72 is defined in the cam 26 to receive a square section shaft 73 in rotatably therethrough. The indentations 72 permit the cam 70 to be arranged in any one of twelve angularly differentiated orientations between 0° and 330° advanceable in increments of 30°. The cam has a fixed radius R over 180° and a reduced radius over the rest.

Figure 20:
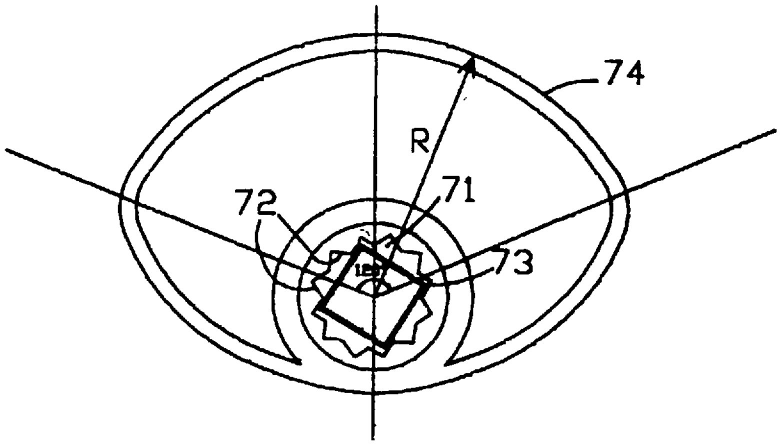
Figure 21:
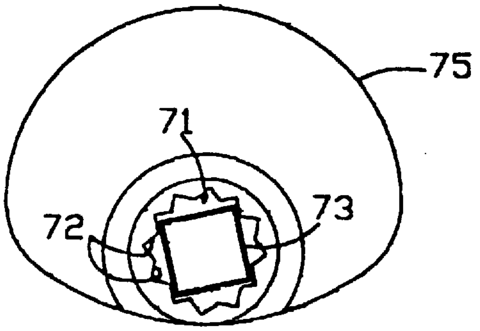

FIGS. 20 and 21 show cams 74 and 75 respectively having alternative profiles for inducing a travelling wave in the surface presented by the beams 2. In particular, cam 74 has a sector of constant radius 76 of 120°. Cam 74 has a fixed radius R over 120°, the remainder being of reduced radius. Cam 75 has a generally oval profile.

Figure 22:
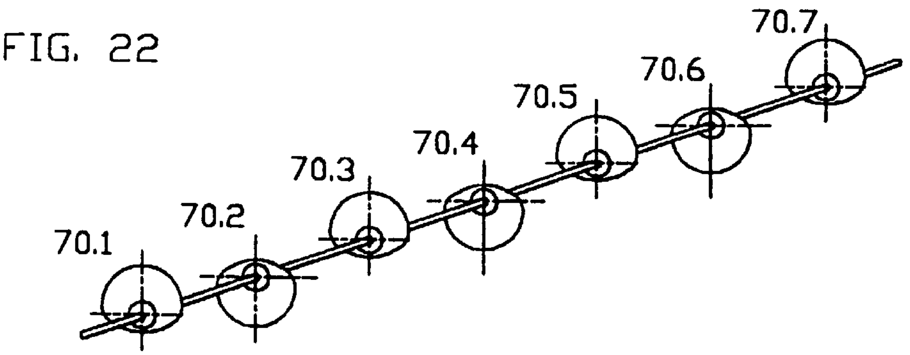
FIGS. 22 to 24 show three dimensional views of portions of four cam and shaft assemblies.

In FIG. 22, successive pairs of cams 70.1, 70.2, etc. are arranged at 180° relative to each other to induce a decubitis action in use.

Figure 23:
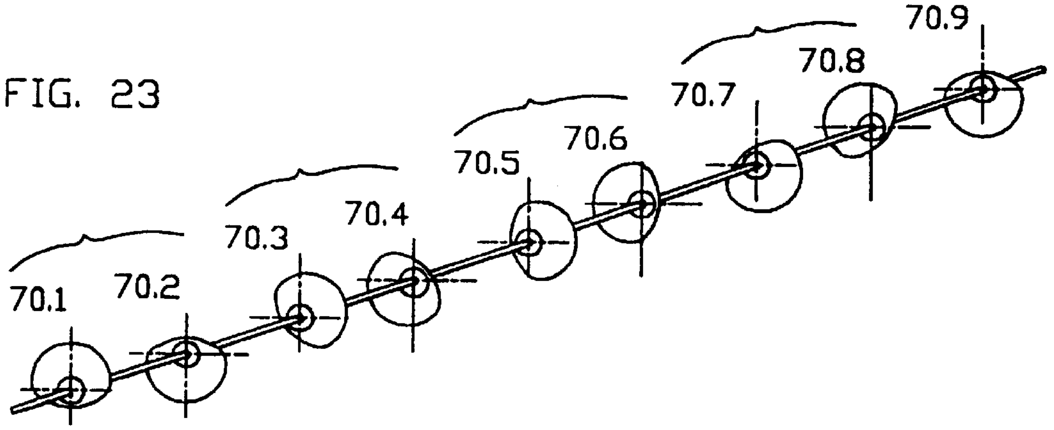

In FIG. 23, a first pair of cams 70.1, 70.2 are arranged at 0° and 180° on an axis of rotation of the shaft 73 respectively. A second pair of cams 70.3, 70.4 are arranged at 45° and 225° respectively. A third set of cams 70.5 and 70.6 are arranged at 90° and 270° respectively. A fourth set of cams 70.7 and 70.8 are arranged at 135° and 315° respectively. The arrangement of said pairs of cams 70.1 to 70.8 induce a combined decubitis and travelling wave action in use.

Figure 24:
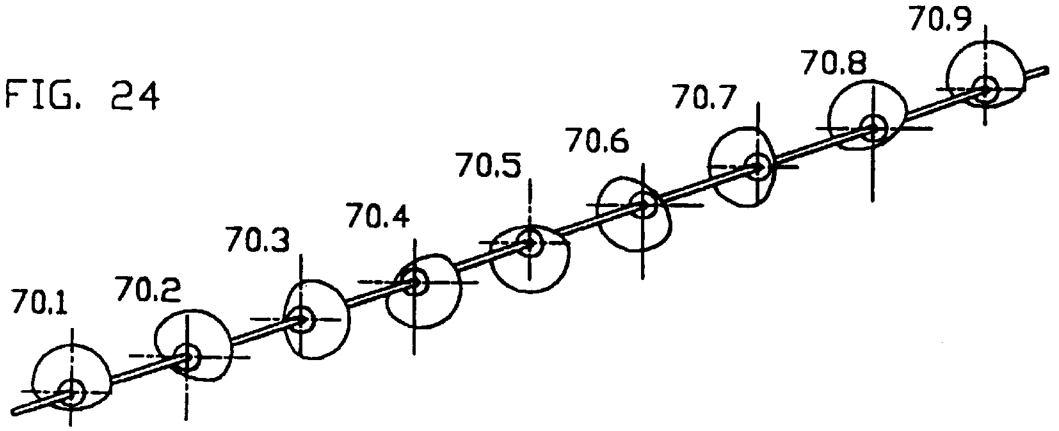

In FIG. 24 the successive cams 70,1 70,2, etc. are advanced relative to preceding cams along the shaft in increments of 45° to induce a travelling wave action in the beams in use.

It will be appreciated that instead of a plurality of cams as used in any of FIGS. 22 to 24 a single formation, e.g. a moulding, extending the full length of the cams 70.1 to 70.2 integrally, could be provided; this could be fitted on the shaft or constitute the shaft itself. In general slats may be operated in pairs so that a wider support is provided; narrow slats, e.g. 5 cm wide, may be provided for a more marked effect, for some applications, or operated in pairs to give a wider support, e.g. 10 cm., for a "gentler" effect, for other applications.

Figure 30:
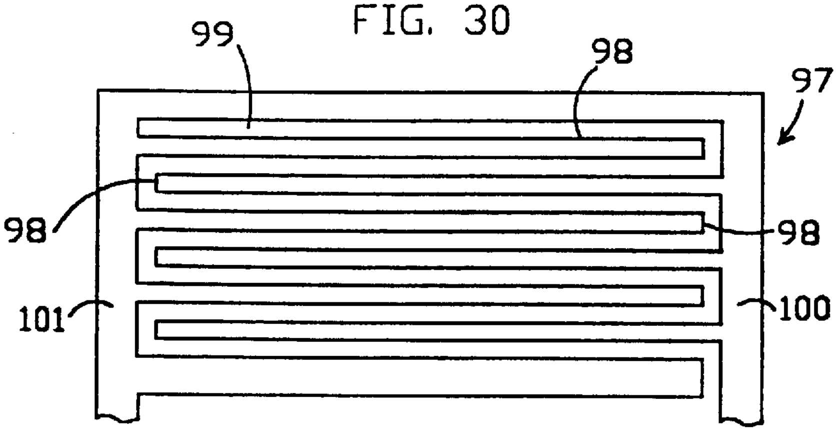
FIGS. 30 to 32 show plan views of three alternative planar support members.

FIG. 25 shows a longitudinal section of an apparatus similar to that shown in FIG. 1 wherein pivotable pairs of channels 76.1 and 76.2 are arranged towards opposing ends of a longitudinal member 78 of the frame 1. The beams 2 extend transversely between and interconnect each pair of channels 76.1 and 76.2 which are pivotable between and inclined position as shown in FIG. 30 and a declined position wherein the beams 2 engage and are manipulated by the cams 4.1 located towards opposing ends of the shaft 3. Retaining linkages 77 which extend between the channels 76 and the longitudinal members 78 are provided to releasably retain the channels 76 in the inclined position.

In FIG. 26, a frame 79 which carries beams 2 and a shaft and cam assembly (not seen) has pivotable end portions 81. Portions 81 are each only a frame and stretched fabric or other comfortable support and are folded up leaving the beams and shaft still flat in the frame.

FIG. 27 shows a longitudinal section of a portion of an apparatus wherein an inclined footrest 84 which carries a shaft and cam assembly 85 for manipulating beams 2 carried by the footrest 84 is provided at an end of the frame 1. The shaft 3 and shaft and cam assembly 85 are rotatably connected by a universal coupling joint 82.

Figure 28:
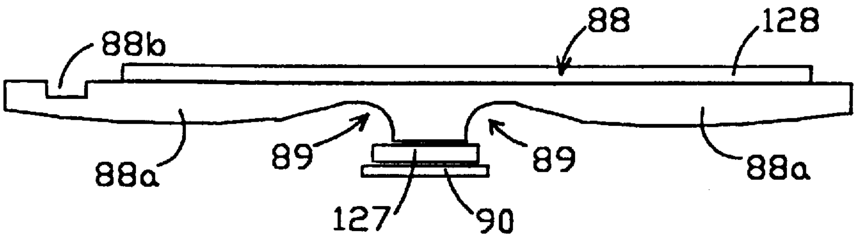
FIGS. 28 and 29 show transverse elevations of two further transverse beams.

FIG. 28 shows a beam 88 similar to that of beam 2 shown in FIG. 2 wherein zones of flexibility 89 are provided on either side of a cam follower 90. The zones of flexibility 89 are provided by reducing the thickness of the beam 88 in said zones. The stiffer parts 88a can be one or more flanges. A slot 88*b* locates it at one end in a bed frame. A wearing pad 90*b* can have different thicknesses to adjust the levels at which the beam oscillates or spacers 127 of differing thicknesses; the beam may have holes to clip them in place. Spacers 128 could alternatively be put on top of the beam.

Figure 29:
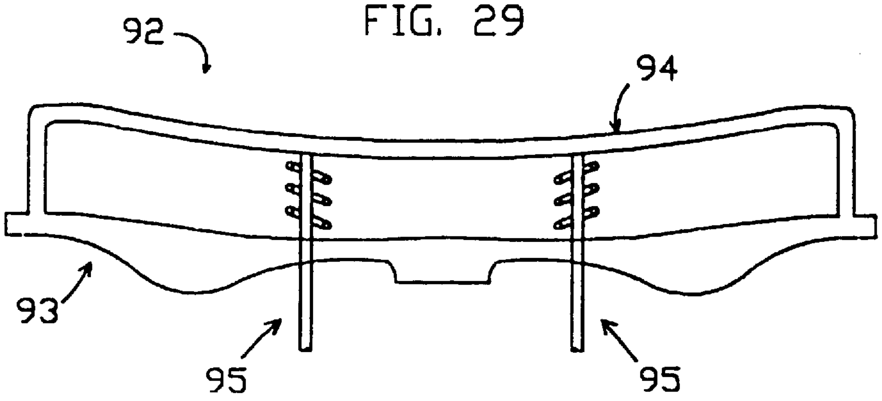
Figure 34:
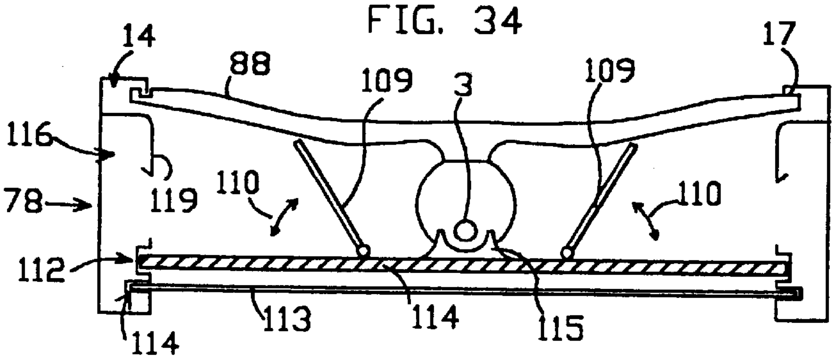
FIG. 34 is an end view of an apparatus incorporating a limiting device for limiting the deflection of the beams.

FIG. 29 shows an integral beam 92 having a base portion 93 of similar form to beam 88 and a support portion 94 mounted thereon. A pair of post and spring assemblies 95 similar to that shown in FIG. 19 urge the support portion 94 towards an inoperative biased position as shown in FIG. 34. In operation the post and spring assemblies 95 are disengaged to permit the support portions 94 to be displaced towards the base portion 93 so as to conform to the profile of a prone body supported thereby. The post and spring assemblies 95 are then locked in position in similar manner to that described with reference to FIG. 17.

FIG. 30 shows a portion of an integrally formed planar support member 97 having parallel beams 98 which are defined by a sinuous slot 99. The beams 98 are arranged to extend alternately from opposing longitudinal sides 100 and 101 of the support member 97. The support member 97 is configured to extend between and interconnect the longitudinal members of the frame 1.

Figure 31:
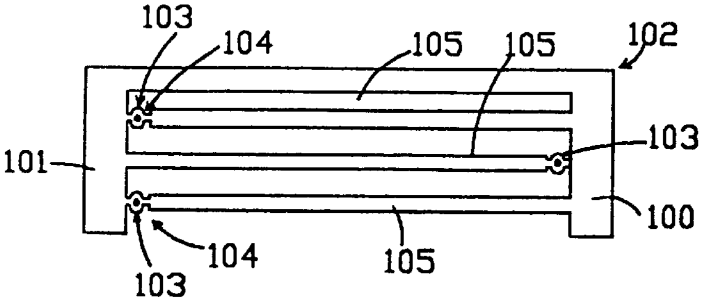

FIG. 31 shows a planar support member 102 similar to that of support member 97 wherein expandable biasing connectors 103 extend between end portions 104 of alternately arranged beams 105 and the longitudinal sides 100 and 101. The connectors 103 include generally ring shaped parts and arms which extend diametrically from the ring shaped parts to interconnect the longitudinal sides 100 and 101 and the beams 105. In operation, as the beams 105 are displaced towards a lower position, so the ring shaped parts expand to allow the beams 105 to follow the profile of the cams.

Figure 32:
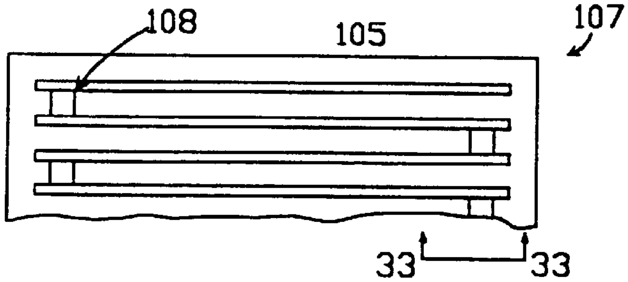
Figure 33:
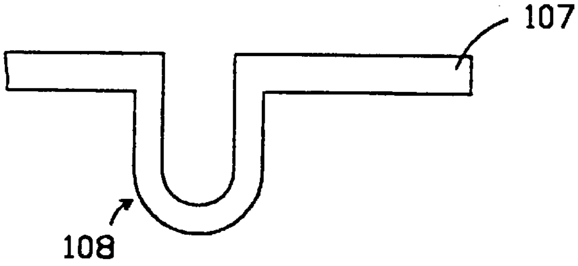
FIG. 33 is a side view of a part of the planar support member shown in FIG. 32 taken along lines 33, 33.

Similarly, FIGS. 32 and 33 show planar support member 107 where expandable biasing connections are provided by generally U-shaped formations 108 which are spring biased so as to act in similar manner to the connectors 103 already described.

FIG. 34 shows an end view of an apparatus wherein there is provided pivotable limiting members 109 which extend along the length of the frame 1. The members 109 are pivotally displaceable in the direction of arrows 110 so as to limit the deflection of the beams 88 in use. Although not shown, actuating arms are provided to displace said members 109.

Figure 35:
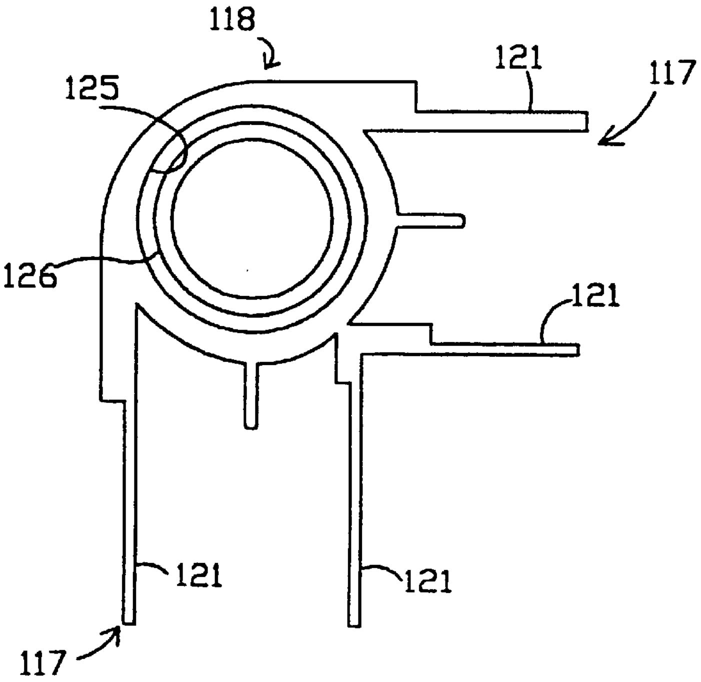
FIG. 35 is a plan view of a corner piece of a frame.

FIG. 35 shows the corner piece 118 having a circular section bore 125 defined therethrough for receiving legs 126 of the frame 1 and a head board frame or side frames (not shown) for retaining a patient on the apparatus. The tubes can support a headboard of the bed for clip boards and/or traction equipment.

Figure 36:
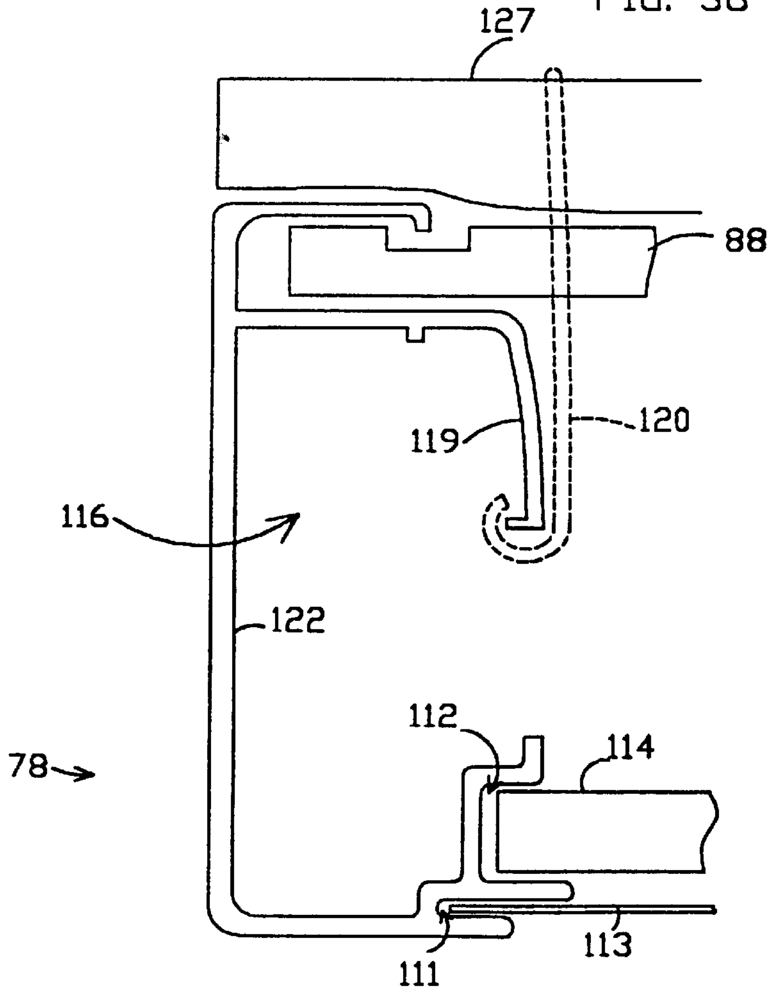
FIG. 36 is an elevation of a profile of a longitudinal member to be used with the corner piece shown in FIG. 35.

FIG. 36 shows a sectional view of longitudinal and transverse frame members 78 of the frame 1, which has channel formations 111 and 112 for receiving and retaining a closure plate 113 and support members 114 for supporting the shaft 3 in bearings 115, The bearings 115 are open topped to allow easily lifting out of the shaft 3, e.g. to re-arrange the cams on it for the bed to serve a new purpose. (See also FIG. 34.) A channel 116 is configured to receive a complementary locating formation 117 (FIG. 3) of a corner piece 118 as shown in FIG. 38. A down turned web 119 allows a connecting member 120 having a hooked portion to retain a foamed strip 127 conforming to the width of the beams 88 thereon. The hook could alternatively be hooked onto the beam 88. The locating formation 117 has tongue formations 121 which engage an inner face of a web 119 and an inner face of a flange 122 of the frame 78. Transverse cross members which extend transversely between the longitudinal frame members 78 have similar profiles to that of the longitudinal frame members 78. The transverse cross members are connected to the corner member 118 in similar fashion to that of the longitudinal frame members 78.

Figure 37:
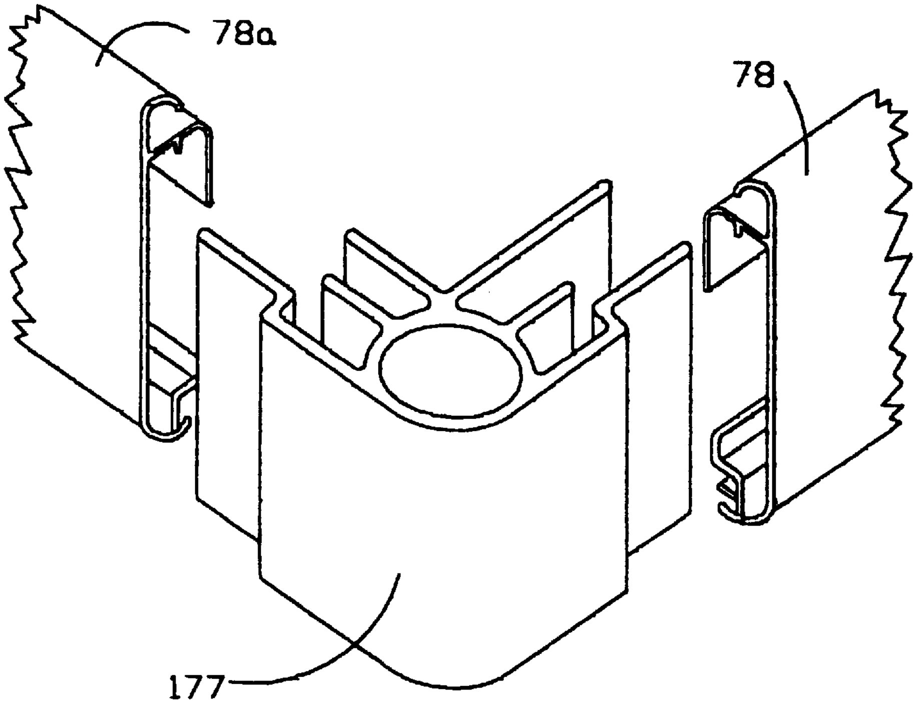
FIG. 37 shows a corner assembly of the frame.
Figure 37:
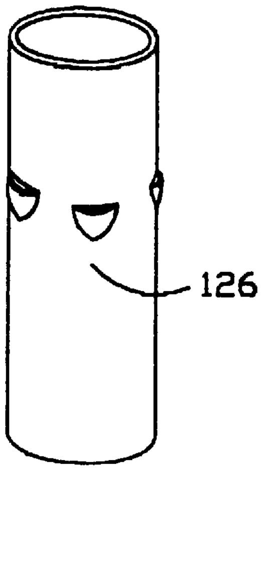

FIG. 37 shows how the corner piece 117 joins a longitudinal frame member 78 and transverse frame member 78*a* as well as a leg 126. These connections are made at each of the four corners to form the frame.

The apparatus described in this specification can be built into a divan, or domestic bed, so that the private owner can save space and have two uses, one as a conventional divan with a mattress on top of the beam, and otherwise for massaging/decubitus.

I claim:

1. An apparatus for supporting a body, the apparatus comprising:

- a frame including a plurality of flexible leaf springs extending parallel and adjacent to each other in a transverse direction to form a support for the body, one end of each leaf spring being secured to the frame and the other end of each leaf spring being enclosed but free to move within a predetermined range
- a single shaft provided beneath the leaf springs and extending in a longitudinal direction which is perpendicular to the transverse direction, the shaft supporting the flexible leaf springs;
- cams mounted to the shaft; and
- a motor operatively connected to the shaft for rotating the shaft and the cams;
- wherein the cams engage at least some of the leaf springs and upon rotation of the cams, predetermined ones of the plurality of flexible leaf springs are flexed by the cams such that adjacent leaf springs are alternatingly raised and lowered.

2. An apparatus as claimed in claim 1, wherein a sliding contact insert is mounted on an under surface of each beam, and is suitably located to engage a cam.

3. An apparatus for supporting a body, the apparatus comprising:

- a frame including a plurality of flexible beams extending parallel and adjacent to each other in a transverse direction to form a support for the body;
- a single shaft provided beneath the beams and extending in a longitudinal direction which is perpendicular to the transverse direction, the shaft supporting the flexible beams;
- cams mounted to the shaft;
- a motor operatively connected to the shaft for rotating the shaft and the cams; and
- a sliding contact insert being mounted on an under surface of each beam and suitably located to engage a cam, each sliding contact insert being provided with a spacer having a thickness selected such that a height of each beam varies according to a predetermined body support profile in the longitudinal direction;
- wherein the cams engage at least some of the beams and upon rotation of the cams predetermined ones of the plurality of flexible beams are flexed by the cams such that adjacent beams are alternatingly raised and lowered.

4. An apparatus for supporting a body, the apparatus comprising:

- a frame including a plurality of flexible beams extending parallel and adjacent to each other in a transverse direction to form a support for the body;
- a single shaft comprising a hollow square tube provided beneath the beams and extending in a longitudinal direction which is perpendicular to the transverse direction, the shaft supporting the flexible beams;
- cams having twelve serrated indentations which allow each cam to be mounted on the shaft in twelve different non-rotatable positions in successive positions along a length of the shaft such that as the shaft is rotated, the cams actuate the beams to effect a travelling wave motion of successive adjacent beams, the wave motion travelling longitudinally along a length of the apparatus; and
- a motor operatively connected to the shaft for rotating the shaft and the cams;
- wherein the cams engage at least some of the beams and upon rotation of the cams predetermined ones of the plurality of flexible beams are flexed by the cams such that adjacent beams are alternatingly raised and lowered.

5. An apparatus for supporting a body, the apparatus comprising:

- a frame including end portions which can be folded such that they extend above a level of a remaining part of the frame, and a plurality of flexible beams extending parallel and adjacent to each other in a transverse direction to form a support for the body;

a single shaft provided beneath the beams and extending in a longitudinal direction which is perpendicular to the transverse direction, the shaft supporting the flexible beams;

cams mounted to the shaft, the cams and the shaft are at the level of the remaining part of the frame; and a motor operatively connected to the shaft for rotating the shaft and the cams;

wherein the cams engage at least some of the beams and upon rotation of the cams predetermined ones of the plurality of flexible beams are flexed by the cams such that adjacent beams are alternatingly raised and lowered.

6. An apparatus as claimed in claim 5, wherein the beams are at the level of the remaining part of the frame.

7. An apparatus for supporting a body, the apparatus comprising:

a frame including a plurality of elongated flexible beams extending parallel and adjacent to each other in a transverse direction to form a support for the body, each of said plurality of flexible beams having a first end being restrained with respect to lengthwise movement and a second end being free with respect to lengthwise movement;

a single shaft provided beneath the beams and extending in a longitudinal direction which is perpendicular to the transverse direction, the shaft supporting the flexible beams;

cams mounted to the shaft; and a motor operatively connected to the shaft for rotating the shaft and the cams, wherein the cams engage at least some of the beams and upon rotation of the cams predetermined ones of the plurality of flexible beams are flexed by the cams such that adjacent beams are alternatingly raised and lowered due to flexure of the predetermined ones of the beams.

8. An apparatus for supporting a body, the apparatus comprising:

a frame including a plurality of flexible beams extending parallel and adjacent to each other in a transverse direction to form a support for the body, each beam is articulated substantially at a central portion of the beam, and at least one end is enclosed but free to move within a predetermined range;

a single shaft provided beneath the beams and extending in a longitudinal direction which is perpendicular to the transverse direction, the shaft supporting the flexible beams;

cams mounted to the shaft; and a motor operatively connected to the shaft for rotating the shaft and the cams;

wherein the cams engage at least some of the beams and upon rotation of the cams predetermined ones of the plurality of flexible beams are flexed by the cams such that adjacent beams are alternatingly raised and lowered.

9. An apparatus as claimed in claim 7, wherein the cams are angularly oriented in successive positions along a length of the shaft such that as the shaft is rotated, the cams actuate the beams to effect a travelling wave motion of successive adjacent beams, the wave motion travelling longitudinally along a length of the apparatus.

10. An apparatus as claimed in claim 7, wherein the frame is selected from the group consisting of a bed, a divan, a chair and a wheelchair.

11. An apparatus for supporting a body, the apparatus comprising:

a frame including a plurality of flexible beams extending parallel and adjacent to each other in a transverse direction to form a support for the body;

journals spring-mounted on the frame which yield in accordance with a load distributed along a length of the apparatus by the body, thereby accommodating a profile of the body;

a flexible cable adapted to flex while rotating, and being rotatably mounted in the journals, said flexible cable being provided beneath the beams and extending in a longitudinal direction which is perpendicular to the transverse direction, the shaft supporting the flexible beams;

cams mounted to the shaft; and a motor operatively connected to the shaft for rotating the shaft and the cams, wherein the cams engage at least some of the beams and upon rotation of the cams predetermined ones of the plurality of flexible beams are flexed by the cams such that adjacent beams are alternatingly raised and lowered.

12. An apparatus for supporting a body, the apparatus comprising:

a frame including a plurality of flexible beams extending parallel and adjacent to each other in a transverse direction to form a support for the body;

a single shaft provided beneath the beams and extending in a longitudinal direction which is perpendicular to the transverse direction, the shaft supporting the flexible beams;

cams mounted to the shaft and angularly oriented in successive positions along a length of the shaft such that as the shaft is rotated, the cams actuate the beams to effect a travelling wave motion of successive adjacent beams, the wave motion travelling longitudinally along a length of the apparatus such that a wave form of the wave motion has a flat top; and a motor operatively connected to the shaft for rotating the shaft and the cams, wherein the cams engage at least some of the beams and upon rotation of the cams predetermined ones of the plurality of flexible beams are flexed by the cams such that adjacent beams are alternatingly raised and lowered.

13. An apparatus as claimed in claim 12, wherein the travelling wave is induced for a time period of between 5 and 30 minutes.

14. An apparatus as claimed in claim 13, wherein the time period is between 10 and 20 minutes.

15. An apparatus as claimed in claim 12, wherein a rate of movement of the travelling wave motion is between 25 and 100 millimeters per second.

16. An apparatus as claimed in claim 15, wherein the rate of movement is between 40 and 60 millimeters per second.

* * * * *